(12) United States Patent
Pedersen et al.

(10) Patent No.: US 11,359,604 B2
(45) Date of Patent: Jun. 14, 2022

(54) METHOD FOR REDUCING OSCILLATIONS IN WIND TURBINE BLADES

(71) Applicant: Vestas Wind Systems A/S, Aarhus N. (DK)

(72) Inventors: Gunnar K. Storgaard Pedersen, Skjern (DK); Ivar J. B. K. Jensen, Hornslet (DK); Gerner Larsen, Hinnerup (DK); Christian Skov Frederiksen, Videbæk (DK); Klaus Lynge Petersen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 359 days.

(21) Appl. No.: 16/621,033

(22) PCT Filed: Jun. 21, 2018

(86) PCT No.: PCT/DK2018/050151
§ 371 (c)(1),
(2) Date: Dec. 10, 2019

(87) PCT Pub. No.: WO2019/001661
PCT Pub. Date: Jan. 3, 2019

(65) Prior Publication Data
US 2020/0116128 A1  Apr. 16, 2020

(30) Foreign Application Priority Data
Jun. 21, 2018 (DK) .......................... PA 2017 70528

(51) Int. Cl.
*F03D 7/00* (2006.01)
*F03D 7/02* (2006.01)
(Continued)

(52) U.S. Cl.
CPC .......... *F03D 7/0296* (2013.01); *B64C 39/024* (2013.01); *F03D 7/048* (2013.01);
(Continued)

(58) Field of Classification Search
CPC ........ F03D 7/0296; F03D 7/048; F03D 17/00; F03D 80/00; B64C 39/024;
(Continued)

(56) References Cited

U.S. PATENT DOCUMENTS

2009/0169379 A1* 7/2009 McClintic ............. F03D 7/0236
416/31
2015/0266575 A1  9/2015 Borko
(Continued)

FOREIGN PATENT DOCUMENTS

CN  103154697 A  6/2013
CN  206035727 U  3/2017
(Continued)

OTHER PUBLICATIONS

China National Intellectual Property Administration, First Notification of Office Action in CN Application No. 201880043496.7, dated Jul. 3, 2020.
(Continued)

*Primary Examiner* — Yonel Beaulieu
(74) *Attorney, Agent, or Firm* — Wood Herron & Evans LLP (57) ABSTRACT

A system for a wind park including: a control system in communication with a plurality of unmanned air vehicles, wherein the control system is configured to deploy one or more unmanned air vehicles during a triggering condition; and wherein the deployed unmanned air vehicles are guided towards an assigned wind turbine and to interact with a blade of that wind turbine in order to control oscillation of the blade. The invention also embraces a method for reducing
(Continued)

blade oscillations of a wind turbine, comprising: monitoring for a triggering condition associated with the wind turbine; on detecting the triggering condition, deploying unmanned air vehicles towards a wind turbine and interacting with a blade of the wind turbine using the unmanned air to control oscillation of the blade. The invention therefore provides an efficient approach to controlling blade oscillations with minimal human operator involvement. Drones may be deployed automatically once suitable conditions are detected and may automatically engage with the blades, either by contacting those blades physically, or by interacting with the blades in close proximity, in order to disrupt airflow around the blades thereby reducing oscillations.

32 Claims, 8 Drawing Sheets

(51) Int. Cl.
*F03D 17/00* (2016.01)
*B64C 39/02* (2006.01)
*F03D 7/04* (2006.01)
*G05D 1/00* (2006.01)
*F03D 80/00* (2016.01)
*G05D 1/10* (2006.01)

(52) U.S. Cl.
CPC ............ *F03D 17/00* (2016.05); *F03D 80/00* (2016.05); *G05D 1/101* (2013.01); *B64C 2201/00* (2013.01); *B64C 2201/12* (2013.01); *B64C 2201/123* (2013.01); *B64C 2201/141* (2013.01); *B64C 2201/143* (2013.01); *B64C 2201/145* (2013.01); *B64C 2201/146* (2013.01); *B64C 2201/18* (2013.01); *B64C 2201/20* (2013.01); *F05B 2260/964* (2013.01)

(58) Field of Classification Search
CPC ............ B64C 2201/00; B64C 2201/12; B64C 2201/123; B64C 2201/141; B64C 2201/143; B64C 2201/145; B64C 2201/146; B64C 2201/18; B64C 2201/20; B64C 39/02; G05D 1/101; G05D 1/00; F05B 2260/964; Y02E 10/72
See application file for complete search history.

(56) References Cited

U.S. PATENT DOCUMENTS

| | | |
|---|---|---|
| 2015/0267688 A1 | 9/2015 | Krampe |
| 2016/0023761 A1 | 1/2016 | McNally |
| 2016/0138566 A1 | 5/2016 | Ippolito |
| 2020/0056584 A1* | 2/2020 | Sia .......................... F03B 13/22 |
| 2020/0201332 A1* | 6/2020 | Pedersen ................ G05D 1/104 |

FOREIGN PATENT DOCUMENTS

| | | |
|---|---|---|
| CN | 106706241 A | 5/2017 |
| CN | 106741887 A | 5/2017 |
| EP | 3112667 A1 | 1/2017 |
| JP | 2016042087 A | 3/2016 |
| JP | 2017115787 A | 6/2017 |
| WO | 2015150529 A1 | 10/2015 |
| WO | 2016149545 A1 | 9/2016 |
| WO | 2017110743 A1 | 6/2017 |

OTHER PUBLICATIONS

Danish Patent and Trademark Office, Search and Examination Report in PA 2017 70528, dated Dec. 1, 2017.
European Patent Office, International Seach Report and Written Opinion in PCT Application No. PCT/DK2018/050151, dated Sep. 12, 2018.

* cited by examiner

METHOD FOR REDUCING OSCILLATIONS IN WIND TURBINE BLADES

FIELD OF THE INVENTION

This invention relates to a system and a method for providing protection to wind turbines during a shutdown condition by reducing the likelihood of uncontrolled oscillation of the wind turbine blades.

BACKGROUND OF THE INVENTION

When wind turbines are not generating power, it is usually necessary to pitch the blades out of the wind to reduce generated lift. This is typically referred to as 'feathering' of the blades.

In a constant flow of wind, feathering the blades works acceptably. However, typically wind varies in both strength and direction and this changeable flow of wind around the blades can generate unpredictable forces on the blades which can cause the blades to oscillate in both edgewise and flapwise directions. If blade oscillation is not controlled, the blades may continue to oscillate at greater amplitudes which can result in damage to the blades.

One approach to this problem is to disrupt the flow of wind about the blades by attaching a net-like sleeve or sock onto a portion of the blade. These are sometimes called 'blade socks'. An example of this is shown in EP3112667A1. Although being a useful solution to the issue of blade oscillations, blade socks are time consuming to fix to the blades and require a great deal of manual intervention by maintenance personnel in order to secure them into place. This issue is further complicated in offshore environments where it is usually more complicated and expensive to deploy maintenance personnel, and where environmental conditions make it more challenging to carry out the work. A more efficient approach is desirable. It is against this background that the embodiments of the invention have been devised.

STATEMENT OF INVENTION

In one aspect, the embodiment of the invention provide a system for a wind park including: a control system in communication with a plurality of unmanned air vehicles, wherein the control system is configured to deploy one or more unmanned air vehicles during a triggering condition; and wherein the deployed unmanned air vehicles are guided towards an assigned wind turbine and to interact with a blade of that wind turbine in order to control oscillation of the blade.

The invention also embraces a method for reducing blade oscillations of a wind turbine, comprising: monitoring for a triggering condition associated with the wind turbine; on detecting the triggering condition, deploying unmanned air vehicles towards a wind turbine and interacting with a blade of the wind turbine using the unmanned air to control oscillation of the blade.

The invention therefore provides an efficient approach to controlling blade oscillations with minimal human operator involvement. Drones may be deployed automatically once suitable conditions are detected and may automatically engage with the blades, either by contacting those blades physically, or by interacting with the blades in close proximity, in order to disrupt airflow around the blades thereby reducing oscillations.

As an alternative to interacting with the blades, the invention is useful for reducing oscillatory movement of other components of a wind turbine. For example the invention may be expressed as a method for reducing tower oscillations of a wind turbine, comprising: monitoring for a triggering condition associated with the wind turbine; on detecting the triggering condition, deploying unmanned air vehicles towards a wind turbine, interacting with a tower of the wind turbine using the unmanned air to control oscillation of the tower.

The one or more unmanned air vehicles may be configured to apply a harness to a blade of the wind turbine, which may be an efficient way for the drones to engage with that blade, for example in order to apply a force to it to stop it from vibrating.

The one or more unmanned air vehicles may be configured to be attachable to the blade. This may be achieved using respective attachment means for attaching said unmanned air vehicles to the blade. That attachment means may comprise a magnetic device configured to couple to a magnetised portion of the blade. The magnetic device may be an electromagnetic so that the magnetisation can be selectively turned on or off so as to control whether or not the drone is coupled to the magnetised portion of the blade.

In some embodiments, the attachment means is a suction cup device for releasably attaching itself to the blade. The suction cup may be a passive device or, in some embodiments, it may be an active device which includes a suction generator in order for the suction cup device to attach to a blade.

The attachment means may also include a suction release valve associated with the suction cup device to release suction from the suction cup device in order to detach the unmanned air vehicle from the surface of the blade. The suction cup device is carried on an articulated arm. A benefit of this is that the arm can engage with the blade whilst extending at a variety of angles from the drone.

The attachment means may also be configured to grip the blade directly, and to this end may comprise a gripper, like a claw, configured to grip onto a portion of the blade.

The unmanned air vehicles may be configured to maintain predetermined relative positions from one another when attached to the blade.

In some embodiment, the unmanned air vehicles are configured to change their mode of operation following attachment to the blade, as this may enhance the air flow disruption effect. For example the unmanned air vehicles may switch to a reverse thrust mode of operation once attached to a respective blade.

The one or more unmanned air vehicle may comprise a recognition system operable to recognise a wind turbine blade and guide the unmanned air vehicle into engagement with said blade. This enables the drones to fly autonomously to the blade and engage with it at a predetermined location, which may be indicated by a suitable marker, for example. The recognition system comprises an optical camera system as part of a suitable machine vision system.

The system may comprise an operations base for the unmanned air vehicles, wherein the unmanned air vehicles are stowed in the operation base when not on deployment. The operations base may comprise a charging system for charging the unmanned air vehicles. The operations base may comprise a door which is openable so as to enable deployment of the unmanned air vehicles from the operations base.

The invention also extends to a wind park comprising a plurality of wind turbines and a system as described above.

BRIEF DESCRIPTION OF THE DRAWINGS

The invention will now be described by way of example with reference to the accompanying drawings, in which.

DETAILED DESCRIPTION OF EMBODIMENTS

Embodiments of the invention provide unmanned aircraft systems (UAS) and unmanned air vehicles (UAV), also referred to as drones, in order to reduce oscillations of stationary wind turbine blades. The embodiments of the invention will be described in the context of the wind turbine being in a shut-down condition, although it should be noted that this is meant simply as an example and the method and systems of the invention may be used to reduce oscillations in other situations such as during installation or low speed modes of wind turbine blades. Still further, although the inventive concept has a particular usefulness in reducing the oscillation of the blades, it may also be used to interact with other parts of the wind turbine to reduce undesirable wind effects, for example vortex shedding on the wind turbine tower.

Figure 1:
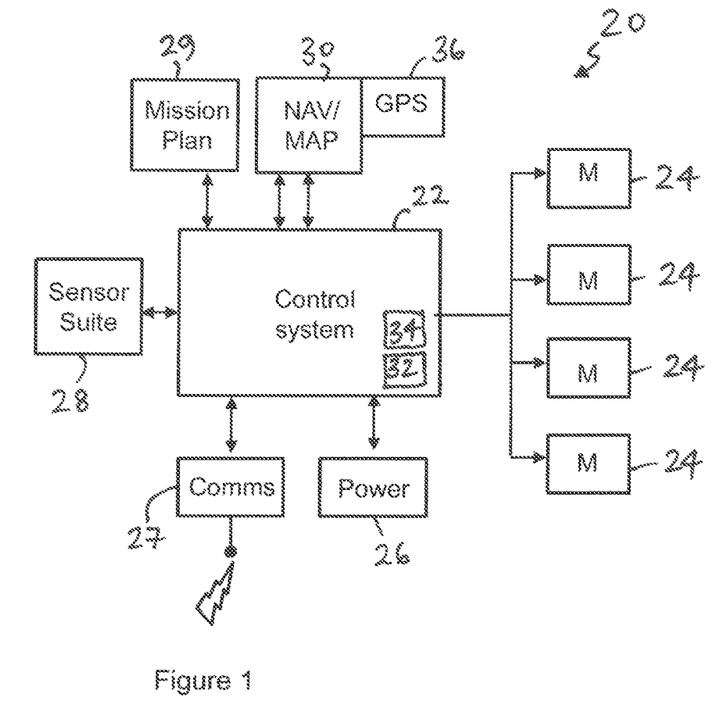
FIG. 1 is a schematic diagram of an exemplary unmanned air vehicle system for use in the embodiments of the invention.

To put the invention into context, FIG. 1 illustrates a system diagram of a typical architecture of a drone system or platform 20 (hereinafter simply 'drone') which may be used in the implementation of the embodiments of the invention. In overview, the drone 20 includes: a control system 22, one or more propulsion units 24, a power system 26, a communication system 27, a sensor suite 28, mission planning system 29 and a navigation system 30. The drone 20 may be operated in conjunction with a ground- or base-station computer system 31, hereinafter referred to as the 'ground-station', which will be described in more detail later with reference to FIG. 2. The various electronic components may be linked by suitable data and power connections, which are either direct connections or by way of a networked data and power bus, such as a CAN-bus (Controller Area Network), which is a common interconnection architecture as would be understood by the skilled person.

The control system 22 is the main computing unit that controls the flight of the drone 20 by controlling the propulsion units 24 based on inputs from the sensor suite 28 and navigation system 30. The control system 22 may implement remote control flight based on received control inputs from a ground based controller, autonomous flight, based on its internal mission planning algorithms, or semi-autonomous flight, in which a blend of on-board mission planning and ground based direction are used. The main responsibility of the control system 22 is as a lower layer controller which is responsible for positional control of the drone (altitude and lateral position), attitude control (pitch, roll and yaw), and velocity control (horizontal and vertical speed) based on remote control actions or based on self-generated flight directions. The control system 22 comprises a suitable processing environment having a processor 32 and a memory 34 with associated on-board communications functionality, such as a data bus, so it is able to communicate with the other on-board systems.

To directly control the flight profile the control system 22 communicates with the one or more propulsion units 24. Four propulsion units 24 are shown here, as would be consistent with the drone system 20 being a quadcopter. However, more or fewer propulsion units are also appropriate. For example an autonomous helicopter may have a single propulsion unit, and, in general, remote control and autonomous multirotor system are known with more or fewer than four rotors. Sometimes these are referred to collectively as aerial robotic systems. The propulsion units may be any suitable units for providing controllable flight for the drone, and may be electric motors driving suitable rotor blades, as are typical with so-called quadcopters (more generally referred to as multirotors) of varying size and lift capacities. However, the propulsion units 24 may also be gas turbines or internal combustion engines, for example.

The on-board power system 26 is selected to be suitable for the propulsion units 24. For example, for electric motors the on-board power system 26 may be a battery pack, a fuel cell, or even an external power plug so as to receive electrical power from an external source. Conversely, the power system 26 could be an on-board fuel tank in the event that the propulsion units are gas-turbines or internal combustion engines.

The communication system 27 provides the means to send and receive data to and from systems that are external to the drone 20. For example, the drone 20 may send telemetry data to the ground station 31, and may send positional, attitude and velocity data to other drones operating in the area, either as part of a drone swarm or operated independently. The communication system 27 may also receive data from external systems, and in this context it may receive remote control commands from the ground station 31 if the drone 20 is operated in remote control flight mode. Such control may take the form of flight path information or waypoints for the drones to follow, rather than direct control commands relating to the propulsion units 24. Alternatively it may upload mission data from the ground station. The communication system 27 also permits incoming and outgoing (two-way) communication with other drones so that flight paths and mission objectives can be coordinated with them to achieve a collective goal. The communication system 27 may direct signals by any means known in the art including, but not limited to, cellular or other phone-based networks, over remote control radio frequency links, UHF or L-band frequency links, microwave frequency links, or other appropriate datalinks, networks, or communication paths.

The sensor suite 28 is operably connected to the control system 22 and provides appropriate sensor data to assist with the operation of the drone. For example, the sensor suite may comprise proximity detectors, a global navigation satellite system/global positioning system (GNSS/GPS) unit for positioning control, optical still and video cameras for carrying out inspection and guidance tasks, inertial navigation units, to name a few examples. Typically such a sensor suite 28 would be adaptable to carry more or fewer sensors as required for a particular task. Note that in this context the GPS unit may receive signals directly from satellites in order to fix the position of the drone, although another option would be to implement a differential GPS system (known in the art) which receives signals from a ground-based differential GPS beacon in order to provide a higher positional accuracy compared to direct GPS. Note that a GPS unit 36 is shown here as being integral with the navigation system 30.

The mission planning system 29 provides a link to the ground station 31 to store missions that have been generated thereon and to which the drone follows in use. The mission planning system 29 may include suitable memory storage and algorithms to store, provide and generate on the fly appropriate mission objectives, waypoints, operational envelopes and so on.

The navigation system 30 provides control inputs to the flight control system 22 regarding path following based on input from GPS data and/or from the sensor suite 28. In embodiments where the drone flight is automated, the navigation system 30 may execute a predetermined mission along a predetermined flight path, either generated for it by the ground station 31, or generated by the drone on-the-fly. Alternatively, the navigation system 30 may be controlled remotely and may require user input such as steering commands.

Figure 2:
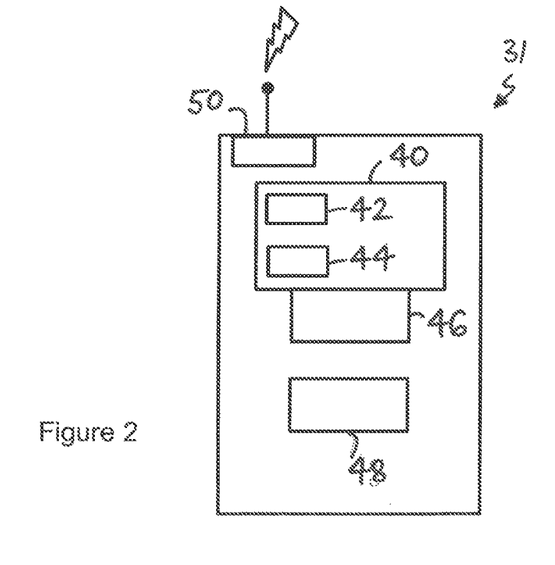
FIG. 2 is a schematic diagram of a ground station for use with the drone system of FIG. 1.

Having described the functional components of the drone 20, discussion will now turn to the ground station 31 as shown in FIG. 2. Ground station 31 provides a ground-based control hub for the one or more drones 20 and is suitably equipped with a computing platform 40 being a controller having an appropriate processing module 42 and memory storage 44. The computing platform 40 implements a suitable ground station software package 46 to provide appropriate ground station facilities for controlling and coordinating the one or more drones. For example, the software package 46 may include telemetry feeds, status information updates, first person visual (FPV) feeds, mission planning interfaces and algorithms and so on. A user interface 48 is provided to enable to a user/operator to view data relating to the drone system and to input control and parameter data into the ground station. The user interface 48 may comprise of a display screen and audio output, and a user input means such as a keyboard, joystick, mouse, on-screen buttons or a combination of these. The ground station also has a communications system 50 in order to send data to and receive data from the one or more drones.

In the context of the invention, the ground station 31 is responsible for configuring the parameters which will trigger deployment of the drones and the response actions that should be implemented following a triggering condition. Appropriate software is provided for this use for an operator to set up these parameters and configurations.

In order to provide the functionality for detecting a triggering condition at a distance from the one or more wind turbines, the ground station may receive input from one or more triggering means (not shown). In embodiments, the triggering means may be sensors associated with the one or more wind turbines. Alternatively, the ground station may comprise a triggering means such as a button or lever for manually initiating deployment. The triggering means may comprise a command or associated command of the controller such as a shut-down mode of the wind turbine, for example. Together, the ground station and the triggering means form a system that is operable to monitor for the presence of a condition which may indicate increased likelihood of oscillations, and to take a suitable response action. In general, it is envisaged that the most likely parameter that could be used to trigger operation of the system would be wind conditions as it is the wind flow (speed, direction, rate of change) that is most likely to affect how the wind turbine moves, particularly the tower and the blades, leading to unacceptable oscillations. However, more direct sensing techniques could be used. For example sensing system could be used to detect how the tower and the blades are moving. Such sensing system may be direct, such as strain gauges installed on those respective components, or accelerometers set up to monitor movement directly. Sensing systems may also be indirect such as optical system to monitor movement or system to monitor variations in power generation. Perhaps more simply, the system could be triggered from a signal indicating a wind turbine shutdown event, for example due to maintenance or an unplanned shutdown due to high winds. A sub-system shutdown could also have the same effect, for example generator failure, cooling system failure, hydraulic system failure, electrical or communication systems failure.

It should be appreciated that the above description of a drone system 20 is intended as merely an example of the main components of an autonomous air vehicle and that other components may also be included in a typical system. In general, it should be noted that drones for use in the embodiments of the invention are known and are able to perform in remote control flight modes, semi- and fully-autonomous flight modes, and are able to carry out manoeuvres in a coordinated fashion in fixed formations with other drones. A suitable drone for this application is the Matrice series from DJI, for example the M200 or M600. Other, preferably commercial grade, drones would also be suitable. Important characteristics to consider are flight endurance, robustness, suitability for swarm, autonomous control and ability to interface with a ground station for mission planning, control, telemetry data and so on.

The above discussion focuses on an example of a drone platform and associated ground station which may be used to give the invention context. The discussion will now focus on particular functionality of the system with reference also to the remaining Figures.

Figure 3:
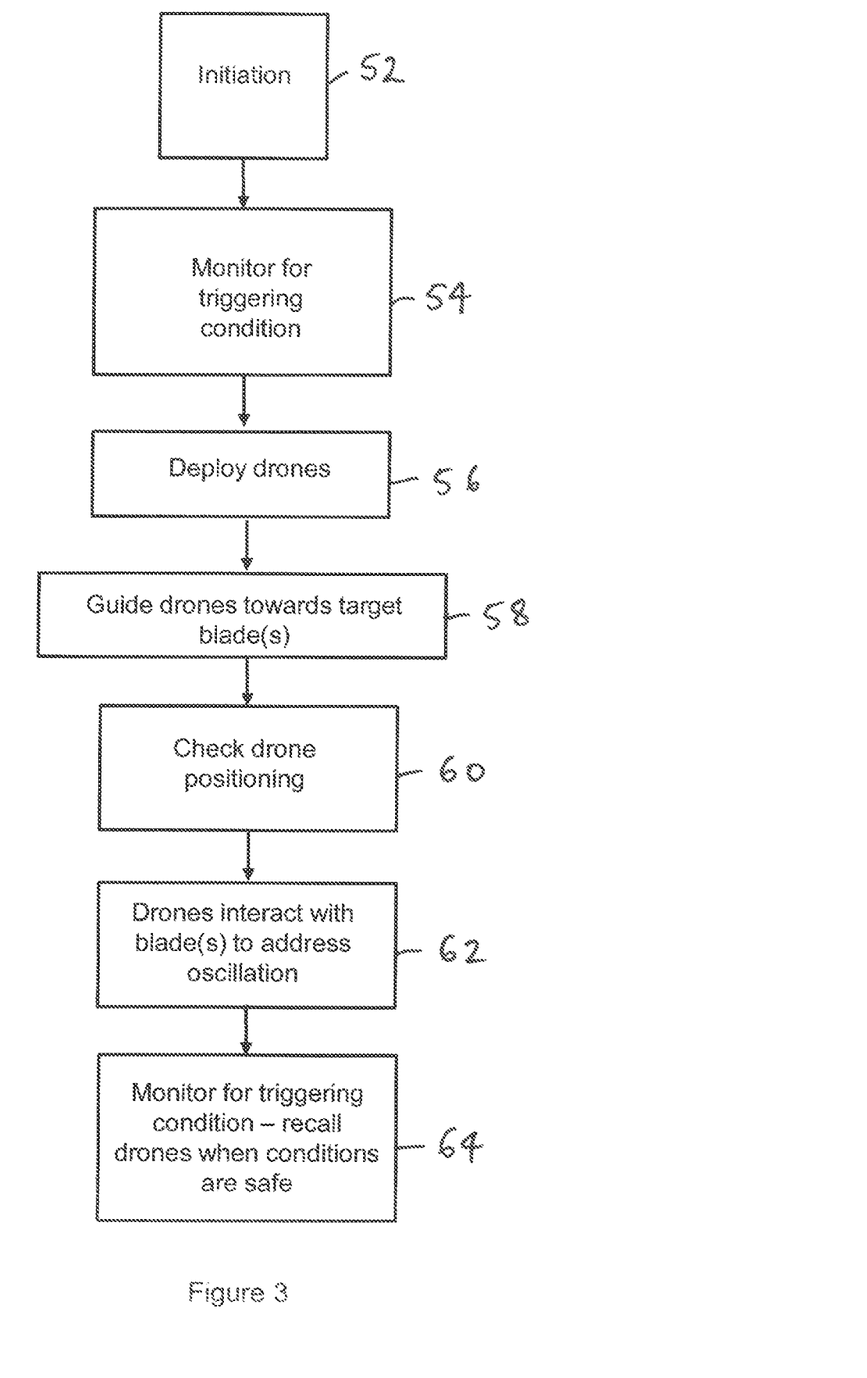
FIG. 3 is a flowchart that illustrates a method for reducing blade oscillations of a wind turbine in accordance with an embodiment of the invention.

FIG. 3 is a flowchart that illustrates a method for reducing blade oscillations of a wind turbine in accordance with an embodiment of the invention.

The method comprises first initiating a system for a wind park shown in step 52. Most broadly, the system includes one or more drones in communication with a control system as described above and a means for detecting a triggering condition indicative of an increased likelihood of oscillation. Initiating the system may include positioning the system in relation to one or more wind turbines in which it is desired to reduce oscillations and may further include configuring one or more drones for deployment as will be explain in more detail below.

Once initiated, the system monitors the one or more wind turbines in order to detect a triggering condition at step 54. The triggering condition may be any condition that indicated increased likelihood of blade oscillations occurring. In a simple implementation, the triggering condition could be when the wind turbine enters or is controlled to enter a shut-down mode. Additionally the triggering condition could be based on the occurrence of a shut-down event and also a measurement of the wind speed and/or wind direction, as discussed above. In such circumstances therefore, the system would only be alerted to potential hazardous conditions if the wind turbine is shut-down and the wind conditions are such that blade oscillation are likely to occur. Taking this approach could reduce the deployment of drones where oscillations are unlikely, and therefore improve the reliability of the system. It is also envisaged that the triggering condition could be present during an installation or maintenance mode of the wind turbine or it may be a manual input from an operator.

Once the triggering condition has been detected for a wind turbine, one or more drones are deployed, for example from an operations base, and guided towards at least one blade of the wind turbine as shown at steps 56 and 58. It is envisaged more likely that a plurality of drones may be deployed, with at least one drone being directed to a respective blade. However, a single drone could be deployed if it is considered that a particular blade is susceptible to oscillations.

The position of the drones is monitored at step 60 to ensure that each drone is in a desired position relative to a respective blade for optimal effectiveness. For example a position towards the tip of the blade is more likely to have the desired effect of reducing blade oscillations. Once the drones are in the desired position relative to the blade, the drones interact with the blade to address oscillation at step 62, and as will be described in more detail below.

At step 64, the system then continues to monitor the one or more wind turbines for the triggering condition. When the triggering condition is no longer detected, the system recalls the drones from their positions relative to the wind turbine blade such that they return to the operations base, for example.

Figure 4:
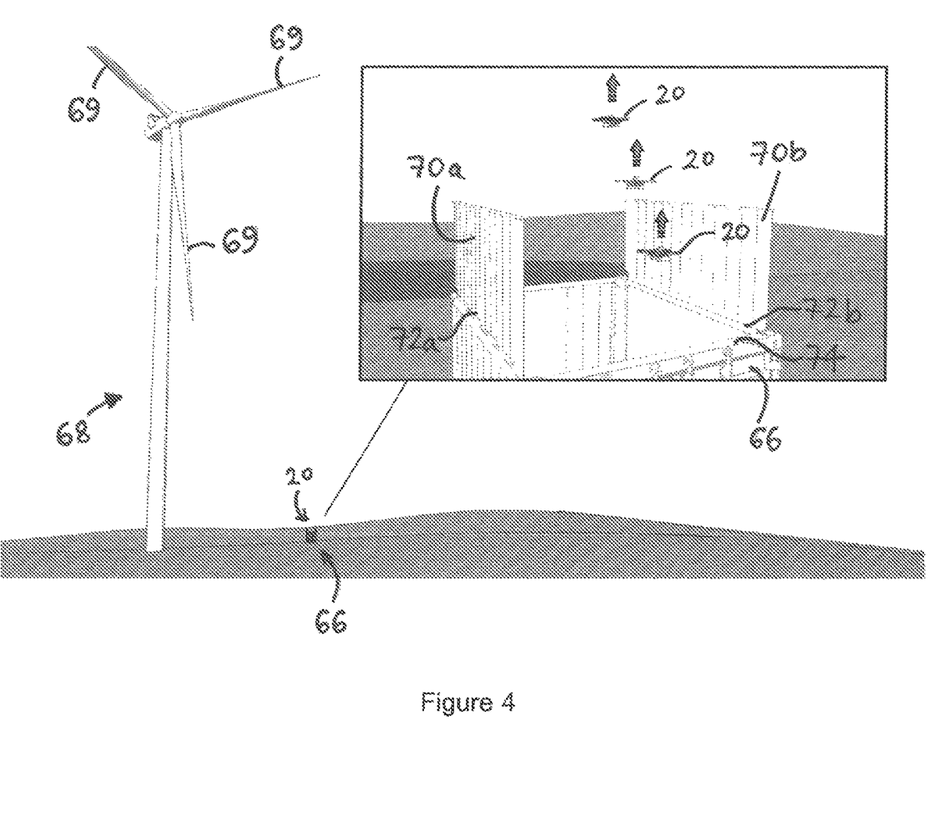
FIG. 4 shows a plurality of unmanned air vehicles being deployed from an operations base.

FIG. 4 shows a plurality of drones 20 being deployed from an operations base 66 adjacent a wind turbine 68 having a plurality of rotor blades 69, in accordance with an embodiment of the present invention. In the illustrated embodiment, the operations base 66 is in the form of a storage container that can store a plurality of drones 20 within it. The storage container 66 with the plurality of drones 20 may be transported between various wind turbines sites or between various wind turbines within the same site as required.

The operations base 66 further includes a charging means (not shown) for charging the plurality of drones 20 while they are stored inside awaiting deployment or during transportation. The drones 20 may be charged by any means known in the art. For example, the drones 20 may each include a plug for attachment to a respective socket in the storage container. Alternatively, the storage container 66 may comprise one or more means for wirelessly charging the drones 20.

Inset of FIG. 4 is a detailed view of the storage container 66. The storage container 66 comprises doors 70a, 70b. In the illustrated embodiment the storage container 66 comprises two doors 70a, 70b each mounted on respective hinges 72a, 72b and positioned over a top surface 74 of the container 66. It will be appreciated that alternative door configurations could be used to allow the deployment of drones 20 from the container. For example, a single door or three or more doors could be used and/or the doors may alternatively be slidably mounted to the container. Furthermore, the one or more doors may additionally or alternatively be mounted to a side surface of the container. Other opening means as known in the art are also envisaged.

The doors 70a, 70b may open automatically in response to the triggering condition being monitored. Alternatively, the triggering condition may activate an alarm which prompts personnel to open the doors 70a, 70b manually or by operating a switch or lever.

Once the doors 70a, 70b are open the drones 20 are controlled to fly out of the storage container 66 in formation. In embodiments, the drones 20 may fly out one-by-one. However, in order to efficiently deploy the drones it is preferred that the drones are deployed simultaneously or, at least, in groups of more than one drone.

Figure 5:
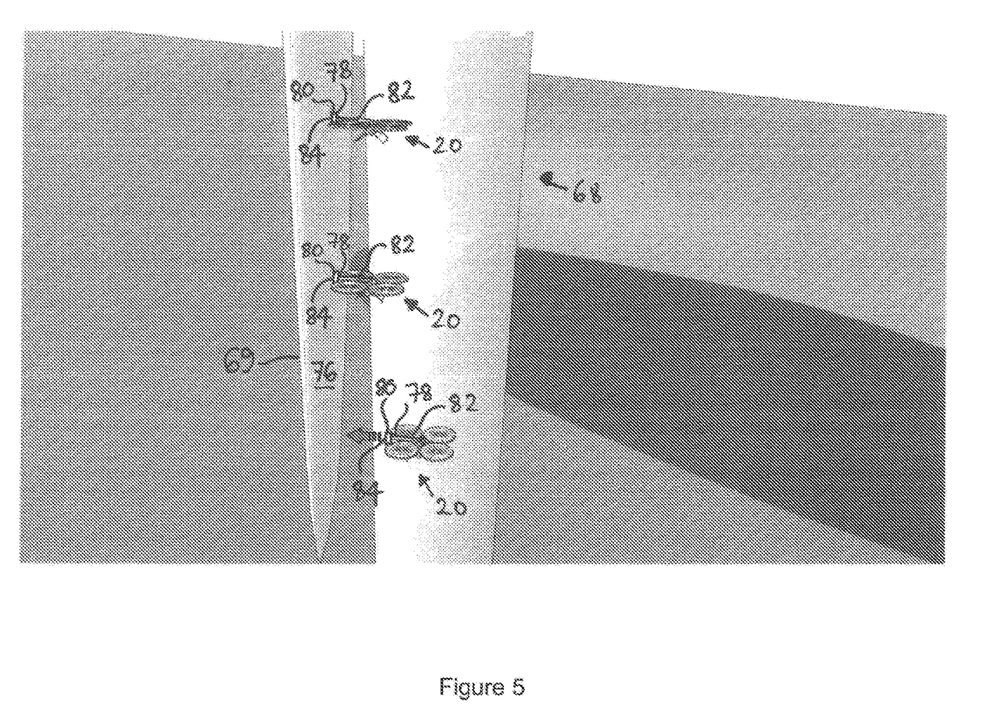
FIG. 5 shows a plurality of unmanned air vehicles approaching and attaching to a wind turbine blade in a horizontal orientation.

FIG. 5 shows a plurality of drones 20 flying towards a turbine blade 69. The turbine blade 69 is oriented vertically such that the blade surface 76 is substantially vertical. Each of the drones 20 comprises a blade attachment means 78 which allows the drone 20 to attach itself to the surface 76 of the blade 69. In this embodiment, the attachment means 78 includes a suction cup 80 mounted to the body of the drone via an arm 82 (shown in more detail in FIG. 7).

The suction cup 80 is oriented such that the suction surface 84 of the cup 80 is parallel with the surface 76 of the blade 69 as the drone 20 approaches it. The drone 20 moves towards the blade surface 76 such that the suction surface 84 engages with the blade surface 76 and the drone 20 is thereby attached to the surface 76 of the blade 69.

The suction cup 80 may be a passive suction cup comprising a flexible curved surface, in the form of a skirt extending from a base, which creates a partial vacuum when pressed against the smooth surface of the blade. In alternative embodiments, the suction cup 80 comprises an active suction cup wherein a partial vacuum is created in the cup using a pump, for example. Active suction pumps may be easier to remove after use by allowing air back into the cup, for example. A passive suction cup may need to be removed manually or by mechanical means.

The drones 20 reduce oscillation of the blades 69 by disrupting the smooth flow of air over the blade 69. The presence of the drones 20 on the surface 76 of the blade 69 creates turbulence which prevents regular vortex shedding that may cause oscillation of the blade 69.

The arrangement of the drones 20 on the blade surface 76 may vary depending on the geometry of the blade 69 and the environmental conditions, for example. The illustrated embodiment shows three drones 20 equally spaced over an outboard portion of the blade 69, however other arrangements of drones 20 could be used to disrupt air over the blade 69. In embodiments, the drones 20 could be arranged over the entire length of the blade 69 or may be positioned over a particular region thereof. Preferably, the drones 20 are attached at least in an outboard portion, for example the outer 10%, 20% or 30% of the blade 69, towards the tip of the blade as these regions may be most susceptible to oscillation.

Any number of drones 20 may be used to disrupt air over the blade. For example, two drones 20 may be positioned on each blade or four or more drones 20, for example five, six, seven or eight or more drones 20 may be mounted on each blade 69. The number of drones 20 used may be limited by the size of each drone 20 and the length of the blade 69 to which it is being mounted.

The drones 20 may be arranged in a regularly spaced array over the length of the blade 69 or may be spaced at varying distances from one another over the length of the blade 69. In some embodiments, for example, the drones 20 may be positioned more closely to each other adjacent the tip of the blade where oscillation is more likely to occur compared with an inboard portion of the blade nearer the root.

In an embodiment, the propulsion system of the drones 20 continues to operate after the drones 20 have attached to the blade 69. This will increase the drones 20 ability to disrupt the airflow across the blades 69 and therefore increase the effectiveness of the system. This could reduce the number of drones 20 needed for a given application.

The drones 20 need not be attached to the blade 69. In some embodiments, the drones 20 simply press against the surface 76 of the blade 69.

In yet further embodiments the drones 20 may hover close enough the surface 76 of the blade 69 to disrupt the flow of air around it without the need to contact the surface of the blade 69. For example, the drones 20 may hover less than 1 metre or less than 50 cm from the blade surface 76.

Figure 6:
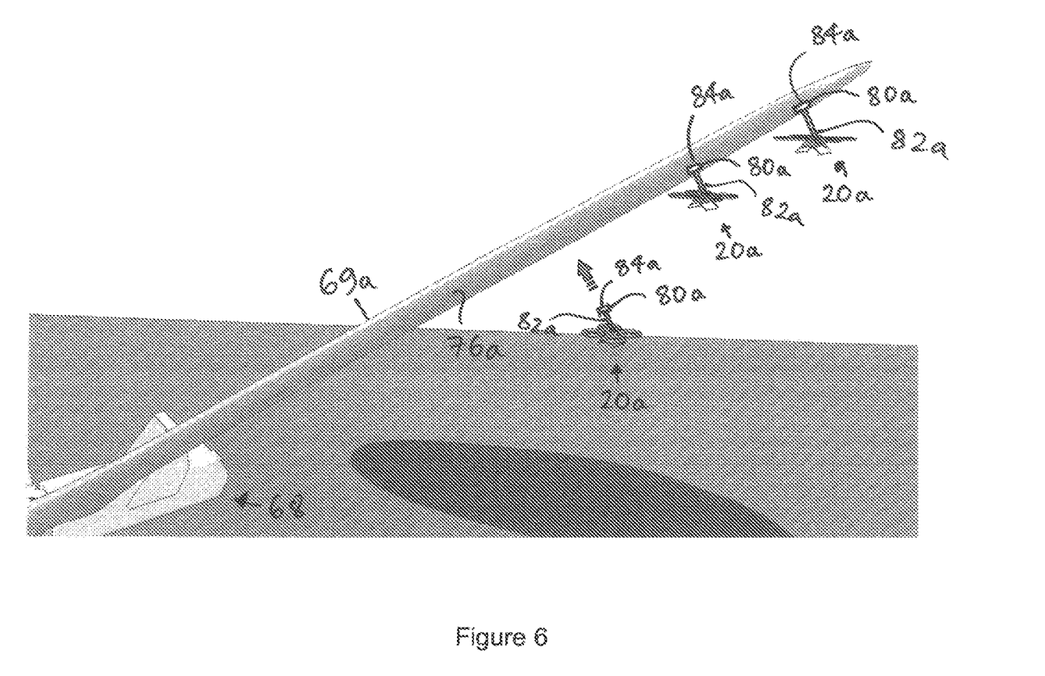
FIG. 6 shows a plurality of unmanned air vehicles approaching and attaching to a wind turbine blade in a different orientation.

FIG. 6 shows a plurality of drones 20a, substantially the same as those illustrated in FIG. 5, approaching and attaching to a wind turbine blade 69a. However, the blade of FIG. 6 is not vertically orientated; rather the blade is oriented at an angle of about 60 degrees from the vertical. Such an orientation may occur in a three bladed wind turbine during a shut-down operation when a so-called Y-configuration of the blades is typically adopted. It will be appreciated that the present invention may be applied to wind turbines having any number of blades and which may be oriented at any angle.

The drones 20a each comprise a suction cup 80a as described above. Again, the suction cup 80a is oriented such that the suction surface 84a of the cup 80a is parallel with the surface 76a of the blade 69a as the drone 20a approaches it. As the blade surface 76a is oriented at an angle of about 60 degrees from the vertical, the suction surface 84a of the cup 80a must also be oriented at 60 degrees from the vertical in order to create a seal therewith. As such, in this arrangement, the arm 82a to which the suction cup 80a is mounted is oriented at an angle substantially perpendicular to the blade surface 76a. Therefore as the drone 20a moves towards the blade surface 76a the suction surface 84a engages with the blade surface 76a and the drone 20a is thereby attached to the surface 76a of the blade 69a.

Figure 7:
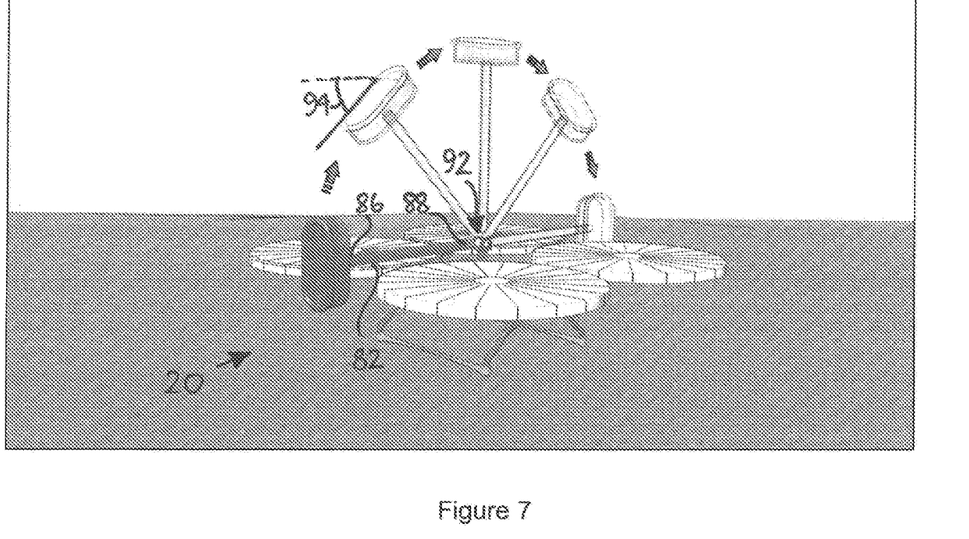
FIG. 7 shows an example unmanned air vehicle having an adjustable attachment means.

The drones 20, 20a described above may comprise a moveable arm 82, 82a such that the same drone can be used to disrupt flow over any of the blades of the wind turbine regardless of its orientation. FIG. 7 shows an example drone 20 having such a moveable arm 82. The arm 82 has a first end 86 attached to the suction cup 80 and a second end 88 attached to the body 90 of the drone 20 at a joint 92. The joint 92 allows movement of the arm 82 between a plurality of positions (shown in phantom) such that the angle 94 of the suction surface 84 of the cup 80 can be adjusted to align with the surface 76 of a blade 69 to which it is to attach. As such, the arm 82 may have a power adjustment mechanism in the form of a set of servo motors and gears to pivot the arm 82 into a desired position.

In embodiments, the drones 20 may be configured to detect a surface orientation of the blade 69 and position the suction cup 80 accordingly. Alternatively the orientation of the suction cup 80 may be set manually or automatically prior to deployment.

Figures 8, 9:
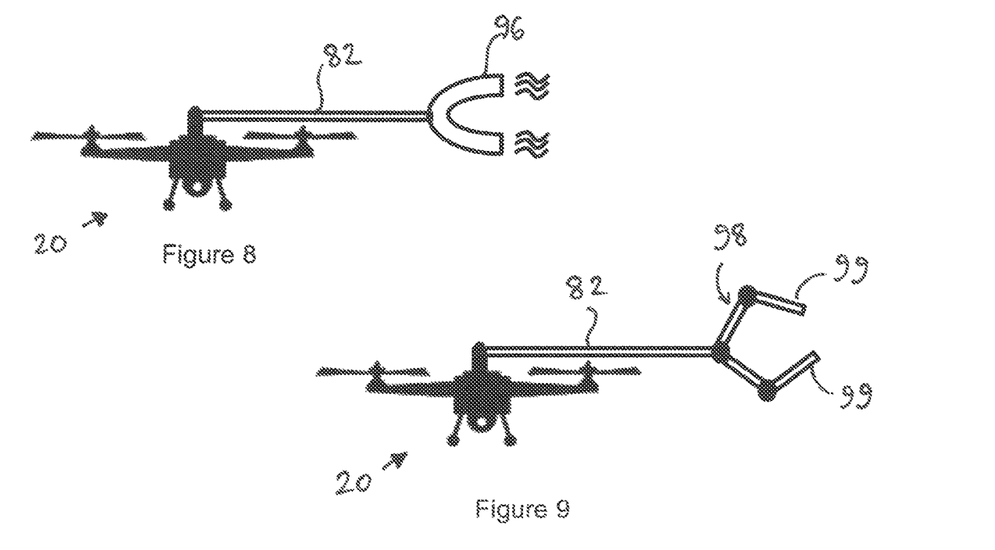
FIGS. 8 and 9 show unmanned air vehicles having alternative attachment means.

FIGS. 8 and 9 show drones 20 having alternative attachment means for attaching to a blade 69. In FIG. 8, for example, the attachment means comprises a magnet 96. The magnet 96 may be configured to mate with a corresponding feature of the wind turbine blade 69. For example, the blade 69 may comprise a plurality of magnetic markers. The magnet 96 may be mounted to the drone 20 via an adjustable arm 82 as described above to allow movement of the magnet 96 relative to the drone 20. The arm 82 may be freely moveable such that, as the drone 20 approaches a magnetic marker, the magnet 96 is attracted to the marker and automatically moves towards it. This may be advantageous as the orientation of the arm 82 need not be adjusted or pre-set for deployment. The magnetic markers may be attached to the blade after production or even built-in to the blade. It is also envisaged that so-called "lightning receptors" or "air terminals" of a blade lightning protection system may serve as magnetic markers.

FIG. 9 shows a drone 20 have an attachment means comprising a gripper 98. The gripper 98 includes two opposing claws 99 for gripping a part of the turbine blade 69 or a dedicated feature mounted on the blade 69. In some embodiments, the gripper 69 may be configured to grip a harness (not shown) and apply the harness to the blade 69 thereby securing the drone 20 to the blade 69 surface 76. The drone 20 may then apply a force to the blade 69 by pulling on the harness once it is in place. In some embodiments the drone may be directly attached to blade holder, for example in the form of a harness or sock for mounting onto the blade 69. In embodiments where the drone 20 is attached to a sock, the sock may function to secure the drone 20 in relation to the blade 69 and may also have an undulating surface (for example formed from a net material) to further disrupt flow and reduce oscillations.

The one or more drones 20 may remain operational while attached to the blade 69. For example, the drones 20 may hover in their respective attached positions or may provide a force against the blade surface 76 in order to secure itself more firmly to the surface 76. An operational drone 20 will create a greater disturbance of the air flow around the blade compared to a drone with stationary rotors and therefore embodiments in which the drones 20 remain operational may require fewer drones 20 across the length of the blade 69.

In embodiments, the drones 20 may not need an attachment means. For example, the drone 20 could make surface contact with the blade using its landing gear or using a fixed or articulated arm and then apply a force to the blade surface 76 to maintain its position. The propulsion units 24 of the drone 20 are operated to effect the force against the blade 69 which is also known as reverse thrust to ensure that the drones remain in contact with the blade 69.

Each drone 20 may travel from the operations base 66 to the blade 69 according to its own flight path. Alternatively, a plurality of drones 20 may include one or more master drones having a flight path and one or more slave drones that position themselves relative to the one or more master drones.

The flight path of the drones 20 may be determined using sensors such as cameras or position sensors which provide feedback to the ground station in order to monitor and update flight along the path. In alternative embodiments the drones may operate 'blind' using only GPS signals or a pre-programmed flight path.

Figure 10:
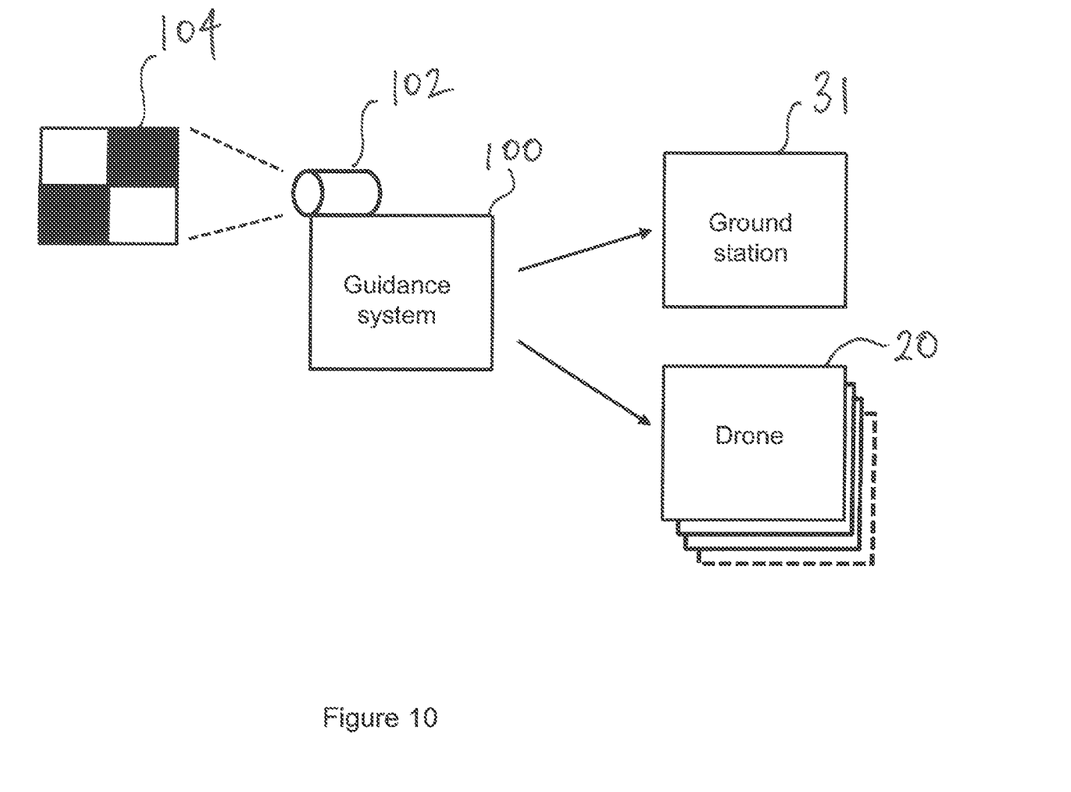
FIG. 10 shows an example guidance system suitable for use with an unmanned air vehicle.

One or more of the drones may comprise a guidance system for determining a desired position on the blade using one or more features of the blade such as markers. FIG. 10 shows an example guidance system 100 suitable for use with a drone 20 as described in any of the embodiments above. The guidance system 100 includes a machine vision system which in this embodiment comprises an optical camera 102. The optical camera 102 may be positioned on the drone 20 and may be configured to view an appropriate optical target 104 on the blade 69. The guidance system 80 therefore is able to recognise the optical target 104 and derive information about the relative distance and orientation of the target 104 in order to provide the drone 20 and/or the ground station 31 with suitable guide path information so that the drone 20 is able to position itself correctly relative to the blade 69. In embodiments where a plurality of drones 20 are deployed together, a master drone may include a camera for detection of a marker and sends signals indicating the desired position of other drones relative to it.

Figure 11:
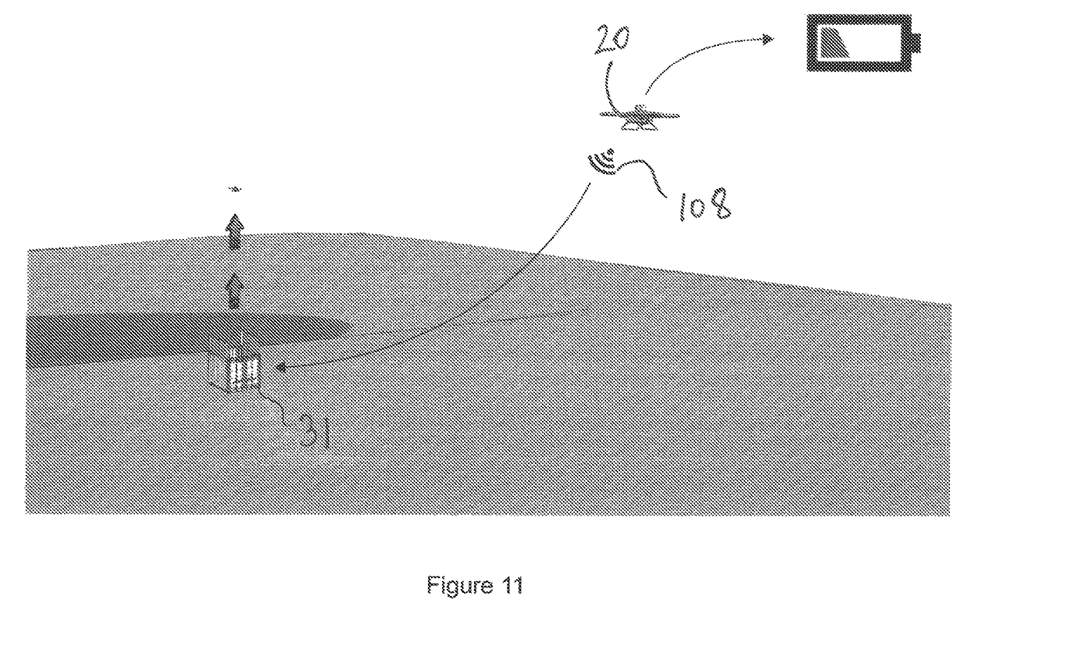
FIG. 11 shows a battery monitoring and charging system for the unmanned air vehicles.

Drones 20 within the system may need to be deployed for long periods of time. Furthermore each drone 20 may be exposed to different flight conditions requiring more or less power relative to each other. For example, some drones 20 may need to fly to positions further away from the operations base 66 in high wind conditions. Drones 20 have a finite amount of energy or charge stored on board which is depleted during flight, particularly in embodiments where the drone 20 stays in operation once attached to the blade 69. As such, the drones 20 may comprise a battery monitoring system for feeding back to the ground station information relating to a charge level of the drone.

FIG. 11 shows an example battery monitoring system for a drone 20. The ground system 31 may be configured to detect a low charge condition of one or more drones 20. Once a low charge condition has been detected a further drone or drones may be deployed to replace the drone 20 having a low charge condition. Each drone may be configured to send data to the ground station 31 relating to a charge condition at regular intervals. Alternatively, each drone may be configured to transmit a signal 108 to the ground station 31 once a low charge condition has been reached. As such, drones 20 which are subjected to the greatest load may be replaced when required without having to replace the entire fleet or swarm of drones. The drones 20 may also remain in constant operation to reduce oscillation of the blade 69 by sequential replacement of the drones 20 as each drone reaches a low charge condition. As described above, the drones may be recharged at the operation base and subsequently used to replace other low charge drones 20. Accordingly, oscillation reduction can occur over a period longer than the on board battery life of the drones 20.

In other embodiments the drones 20 are connected to an external power supply through a tether (not shown).

The use of drones is this way reduces the need for manual installation of nets and the like to reduce oscillation. Furthermore, the ability of the drones to attach to blades in different orientations means that the blades do not need to be rotated in order to install the anti-oscillation-system. Rotating of stationary blades puts considerable load on the wind turbine equipment such as the gear box and thus elimination of this requirement may reduce the torque requirement of the system.

As mentioned above, the invention is particularly useful for reducing the oscillation of blades of a wind turbine. However, this invention can also be applied to towers to reduce oscillation of towers due to vortex shedding. This is especially pronounced during installation until the nacelle has been attached to the tower. In this context, the drones 20 may interact with a surface on the tower (not shown) instead of a blade 69 but in all other respects the above discussion applies.

Therefore in an embodiment the invention relates to:

A system for a wind park including: a control system in communication with a plurality of unmanned air vehicles; wherein the control system is configured to deploy one or more unmanned air vehicles during a triggering condition; and wherein the deployed unmanned air vehicles are guided towards an assigned wind turbine and to interact with a tower of that wind turbine in order to control oscillation of the tower.

Moreover, it relates to a method for reducing tower oscillations of a wind turbine, comprising: monitoring for a triggering condition associated with the wind turbine; on detecting the triggering condition, deploying unmanned air vehicles towards a wind turbine, interacting with a tower of the wind turbine using the unmanned air to control oscillation of the tower.

The invention claimed is:

1. A system for a wind park, comprising:
   a control system in communication with a plurality of unmanned air vehicles;
   wherein the control system is configured to deploy the plurality of unmanned air vehicles during a triggering condition; and
   wherein the plurality of deployed unmanned air vehicles is configured to be guided towards an assigned wind turbine and to interact with a blade of the assigned wind turbine in order to control oscillation of the blade.

2. The system of claim 1, wherein the plurality of unmanned air vehicles is configured to apply a harness to the blade of the assigned wind turbine.

3. The system of claim 2, wherein the plurality of unmanned air vehicles is configured to apply a force to the blade by pulling on the harness once the harness has been applied to the blade.

4. The system of claim 1, wherein the plurality of unmanned air vehicles is configured to be attachable to the blade.

5. The system of claim 4, wherein the plurality of unmanned air vehicles comprises respective attachment means for attaching said plurality of unmanned air vehicles to the blade.

6. The system of claim 5, wherein the attachment means comprises a suction cup device for releasably attaching itself to the blade.

7. The system of claim 6, wherein the attachment means further comprises a suction generator in order for the suction cup device to attach to the blade.

8. The system of claim 6, wherein the attachment means further comprises a suction release valve associated with the suction cup device to release suction from the suction cup device in order to detach the plurality of unmanned air vehicles from the surface of the blade.

9. The system of claim 6, wherein the suction cup device is carried on an articulated arm.

10. The system of claim 5, wherein the attachment means comprises a magnetic device configured to couple to a magnetised portion of the blade.

11. The system of claim 5, wherein the attachment means comprises a gripper configured to grip onto a portion of the blade.

12. The system of claim 4, wherein the plurality of unmanned air vehicles is configured to maintain predetermined relative positions from one another when attached to the blade.

13. The system of claim 4, wherein the plurality of unmanned air vehicles is configured to change their mode of operation following attachment to the blade.

14. The system of claim 13, wherein the plurality of unmanned air vehicles switches to a reverse thrust mode of operation once attached to a respective blade.

15. The system of claim 1, wherein the plurality of unmanned air vehicles comprises an autonomous flight control system to guide said plurality of unmanned air vehicles to the blade without human intervention.

16. The system of claim 15, wherein the plurality of unmanned air vehicles comprises a recognition system operable to recognise the blade and guide the plurality of unmanned air vehicles into engagement with the blade.

17. The system of claim 16, wherein the recognition system comprises an optical camera system.

18. The system of claim 1, comprising an operations base for the plurality of unmanned air vehicles, wherein the plurality of unmanned air vehicles is stowed in the operations base when not on deployment.

19. The system of claim 18, wherein the operations base comprises a charging system for charging the plurality of unmanned air vehicles.

20. The system of claim 18, wherein the operations base comprises a door which is openable so as to enable deployment of the plurality of unmanned air vehicles from the operations base.

21. A method for reducing blade oscillations of a wind turbine, comprising:
    monitoring for a triggering condition associated with the wind turbine;
    on detecting the triggering condition, deploying unmanned air vehicles towards the wind turbine,
    interacting with a blade of the wind turbine using the unmanned air vehicles to control oscillation of the blade.

22. The method of claim 21, wherein interacting with the blade further comprises controlling the unmanned air vehicles to apply a harness to the blade using the unmanned air vehicles.

23. The method of claim 22, further comprising pulling on the harness once the unmanned air vehicles have applied the harness to the blade.

24. The method of claim 21, wherein interacting with the blade further comprises commanding the unmanned air vehicles to fly in close proximity to the blade so as to disrupt the airflow around the blade.

25. The method of claim 21, wherein interacting with the blade further comprises attaching the unmanned air vehicles to the blade.

26. The method of claim 25, wherein attaching said unmanned air vehicles to the blade further comprises making surface contact with the blade and applying a force to the blade by way of that surface contact.

27. The method of claim 25, further comprising, for each deployed unmanned air vehicle, activating an attachment means to releasably attach said unmanned air vehicles to the blade.

28. The method of claim 27, further comprising activating an on-board suction generator on the unmanned air vehicles and bringing a suction cup of the unmanned air vehicles into engagement with the blade.

29. The method of claim 28, further including activating a suction release valve of the unmanned air vehicles to detach the suction cup from the blade.

30. The method of claim 27, including changing a mode of operation of the unmanned air vehicles following attachment of said unmanned air vehicles to the blade.

31. The method of claim 30, wherein changing the mode of operation further comprises switching from a flight mode operation to a reverse thrust mode of operation.

32. A wind park comprising a plurality of wind turbines and the system as claimed in claim 1.

* * * * *